United States Patent [19]

Leng

[11] Patent Number: 5,464,373
[45] Date of Patent: Nov. 7, 1995

[54] BICYCLE SPROCKET ASSEMBLY WITH A CHAIN GUIDING MEANS

[75] Inventor: Tony Leng, Nan-Tou City, Taiwan

[73] Assignee: Cyclone Precision Inc., Taiwan

[21] Appl. No.: 339,829

[22] Filed: Nov. 15, 1994

[51] Int. Cl.[6] ........................................................ F16H 7/18
[52] U.S. Cl. ............................................ 474/140; 474/160
[58] Field of Search ................................... 474/140, 152, 474/158, 160, 164

[56] References Cited

U.S. PATENT DOCUMENTS

| | | | |
|---|---|---|---|
| 5,192,248 | 3/1993 | Nagano | 474/160 X |
| 5,192,249 | 3/1993 | Nagano | 474/140 |

*Primary Examiner*—Michael Powell Buiz
*Attorney, Agent, or Firm*—Welsh & Katz, Ltd.

[57] ABSTRACT

A bicycle sprocket assembly includes a small sprocket wheel, and a large sprocket wheel coaxial with the small sprocket wheel and provided with several guide units each of which includes a notch formed in the large sprocket wheel, and a chain guiding piece that is secured to the inner side surface of the large sprocket wheel and that is adjacent to the notch. The notches are respectively formed in some spaced-apart sprocket teeth of the large sprocket wheel. Each of the notches is formed by an outer guiding surface which extends from a tooth tip to the corresponding tooth valley and which makes a junction with the inner guiding surface of the corresponding piece, so as to slide the chain between the inner and outer guiding surfaces. The pieces are inclined with respect to axial and radial directions of the sprocket assembly. Each of the outer guiding surfaces has a bottom end which is spaced apart from the middle point of the corresponding tooth valley at a predetermined distance so as to contact a tooth tip with the lagging edge of an inner link plate of the chain when shifted the chain from the small sprocket wheel to the large sprocket wheel.

2 Claims, 5 Drawing Sheets

5,464,373

BICYCLE SPROCKET ASSEMBLY WITH A CHAIN GUIDING MEANS

BACKGROUND OF THE INVENTION

1. Field of the Invention

This invention relates to a sprocket assembly for a bicycle, more particularly to a speed varying sprocket assembly with chain guiding means for smoothing transmission of a driving chain between the sprocket wheels of the assembly.

2. Description of the Related Art

In this art, a speed varying sprocket assembly consists of two or more sprocket wheels containing a different number of teeth which are combined for mounting to a rear hub or front crank. The driving chain is shifted axially of the sprocket wheels through a derailleur so as to be switched to a selected one of the sprocket wheels. In a case where a driving chain is shifted from a sprocket wheel smaller in diameter and number of teeth to one larger in diameter and number of teeth, when passing through a point located right in the middle of the space defined between an adjacent pair of inner link plates of the driving chain, the tip of a sprocket tooth may be brought into contact with the leading edge of the lagging one of the adjacent pair of inner link plates due to the fact that the adjacent pair of inner link plates are spaced from each other at a small distance, thus hindering the chain from meshing quickly and smoothly with the teeth. As a result, the meshing of the driving chain with the sprocket wheel is slow, causing idling or the generation of noise between the chain and the sprocket wheel.

SUMMARY OF THE INVENTION

An object of this invention is to provide a speed varying bicycle sprocket assembly with chain guiding means so that the tip of any sprocket tooth of the sprocket assembly is prevented from contact with the leading edge of any inner link plate of the associated driving chain when shifted from a sprocket wheel smaller in diameter and number of teeth to one larger in diameter and number of teeth.

According to this invention, a speed varying sprocket assembly including a small sprocket wheel and a large sprocket wheel which are mounted coaxially so as to permit the chain to be shifted from one to the other one of the small and large sprocket wheels. The tooth number of the small sprocket wheel is smaller than that of the large sprocket wheel. The large sprocket wheel has an inner side surface adjacent to the small sprocket wheel, and a peripheral tooth face defining a plurality of teeth each of which is provided with a tip and a bottom so as to define a tooth valley between any adjacent pair of the teeth. Each of the tooth valleys has a middle point at the bottom end thereof. The large sprocket wheel further has several guide units each of which includes a notch formed in the large sprocket wheel, and an elongated chain guiding piece which is secured to the inner side surface of the large sprocket wheel and which is adjacent to the notch. The notches are respectively formed in some of the teeth which are spaced apart from each other. Each of the notches is formed at a corner defined between the inner side surface and the annular tooth face and is defined by a curved outer guiding surface extending from the tip of a corresponding one of the teeth to one of the tooth valleys which is adjacent to the corresponding one of the teeth. Each of the outer guiding surfaces has a width so as to permit an outer link plate of the chain to slide thereon. Each of the pieces has a radial inner end, a radial outer end, and an inner guiding surface that has a straight intermediate portion, a curved inner end portion and a curved outer end portion which makes a junction with a corresponding one of the outer guiding surfaces so as to guide the chain to slide from the inner guiding surface to the corresponding one of the outer guiding surfaces via the junction. The straight intermediate portions of the inner guiding surfaces of the pieces are inclined with respect to axial and radial directions of the sprocket assembly so as to facilitate the chain to be shifted between the large and small sprocket wheels. Each of the outer guiding surfaces has a bottom end which is spaced apart from the middle point of a corresponding one of the tooth valleys at a predetermined distance so as to make the chain engage with the corresponding one of the teeth, in such a manner that the tip of the corresponding one of the teeth contacts a lagging edge of an inner link plate of the chain. In this way, the tip of each of the teeth of the large sprocket wheel cannot contact the leading edge of any of the inner link plates during meshing of the driving chain with the sprocket teeth. Preferably, the predetermined distance ranges from 1 millimeter to 3 millimeters.

BRIEF DESCRIPTION OF THE DRAWINGS

Other features and advantages of this invention will become apparent in the following detailed description of the preferred embodiment of this invention with reference to the accompanying drawings, in which.

DETAILED DESCRIPTION OF THE PREFERRED EMBODIMENT

Figure 1:
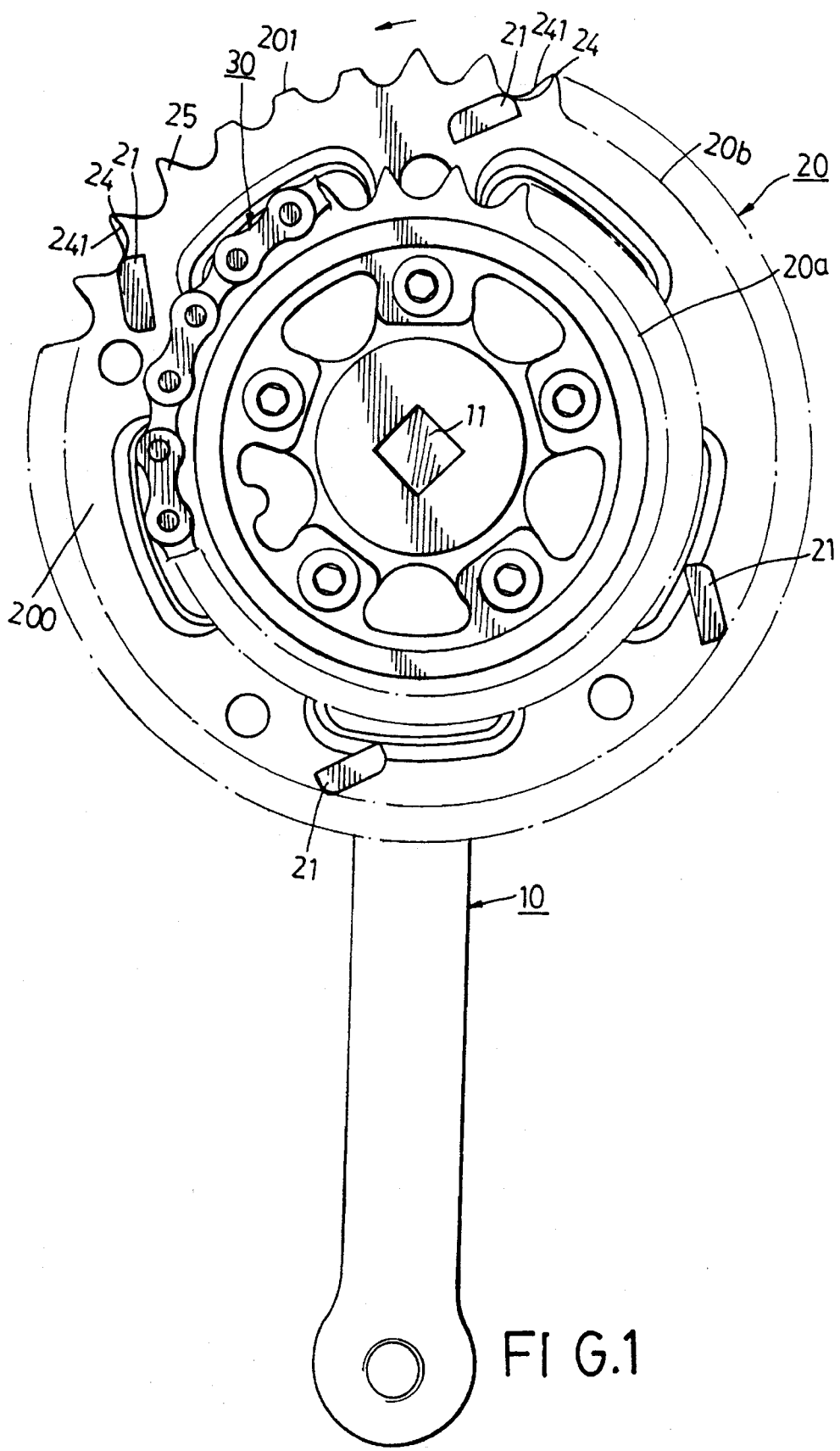
FIG. 1 is schematic side view of a bicycle sprocket assembly according to this invention, in which a greatest sprocket assembly is moved away.
Figure 2:
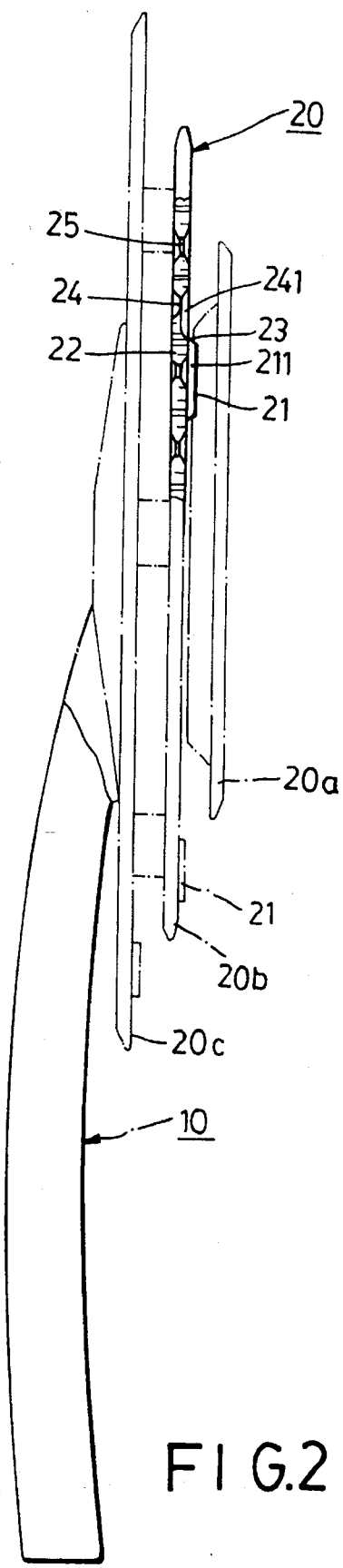
FIG. 2 is an elevational view showing the bicycle sprocket assembly of this invention.

Referring to FIGS. 1 and 2, a bicycle sprocket assembly 20 of this invention is used with a driving chain 30 and includes a small sprocket wheel 20a, a large sprocket wheel 20b larger than the small sprocket wheel 20a in diameter and tooth number, and a greatest sprocket wheel 20c which is not shown in FIG. 1 for clarity. The sprocket wheels 20a, 20b and 20c rotate counterclockwise and are mounted coaxially on a pedal carrying crank unit 10 of a variable-speed bicycle in a known manner. The crank unit 10 has a shaft 11 (see FIG. 1).

Figure 4:
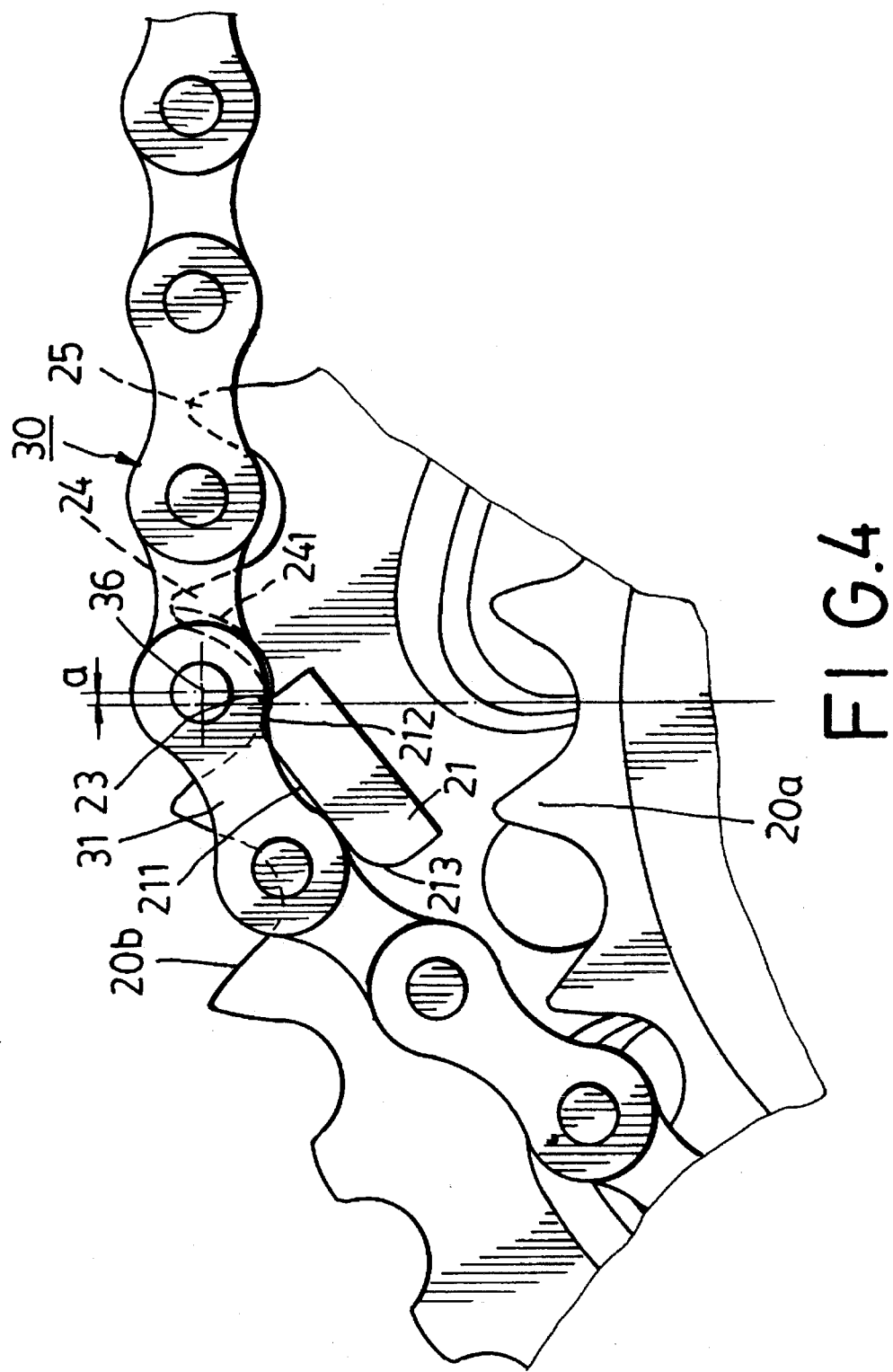
FIGS. 4 and 5 are schematic views illustrating how a driving chain is shifted from a small sprocket wheel to a large sprocket wheel in accordance with this invention.
Figure 5:
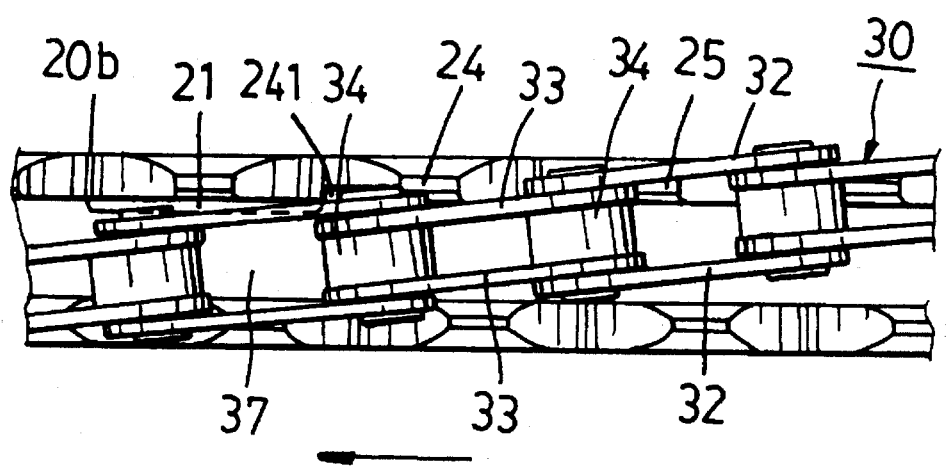

Referring to FIG. 5, the chain 30 moves in the direction indicated by the arrow and consists of a plurality of chain link units 31 (see FIG. 4) each of which includes two aligned outer link plates 32, two aligned inner link plates 33, a roller 34 and a pin 36 (see FIG. 4). A tooth-tip receiving space 37 is defined between each aligned pair of outer link plates 32 and between two rollers 34.

Figure 3:
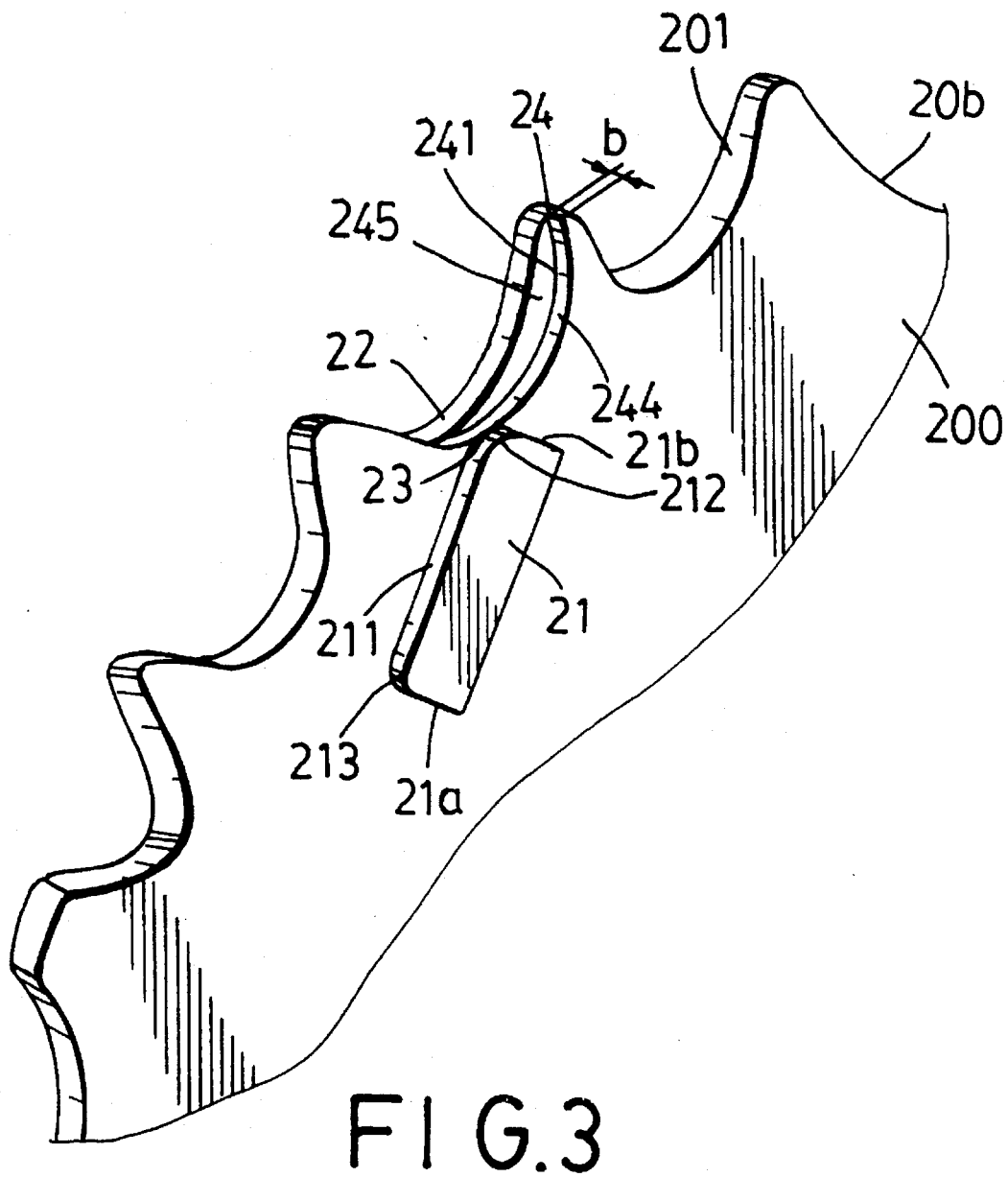
FIG. 3 is a perspective view showing a guide unit of the bicycle sprocket assembly according to this invention.

As best shown in FIG. 3, the large sprocket wheel 20b has an inner side surface 200 which is adjacent to the small sprocket wheel 20a (see FIGS. 1 and 2), an annular peripheral tooth face 201 defining a plurality of teeth 24, and a chain guiding means consisting of four guide units each of which includes a notch 241 formed in a sprocket tooth 24, and an elongated chain guiding piece 21 which is secured to the inner side surface 200 of the large sprocket wheel 20b and which is adjacent to the notch 241. Again referring to FIG. 1, the notches 241 are respectively formed in four angularly equidistant sprocket teeth 24. Each of the notches 241 is formed at a corner defined between the inner side surface 200 and the tooth face 201 and is defined by a curved outer guiding surface 244 extending from the tip 25 of the corresponding sprocket tooth 24 to the corresponding tooth valley 22 (see FIG. 3), and by a plane 245 (see FIG. 3) parallel to the inner side surface 200.

As shown in FIG. 3, each of the outer guiding surfaces 244 has a width (b) so as to permit an outer link plate 32 of the chain 30 to slide thereon. Each of the pieces 21 has a radial inner end 21a, a radial outer end 21b, and an inner guiding surface which has a straight intermediate portion 211, a curved outer end portion 212 and a curved inner end portion 213. As illustrated, the outer end portion 212 of the inner guiding surface makes a junction 23 with the corresponding outer guiding surface 244 so as to guide the chain 30 (see FIG. 1) to side from the inner guiding surface to the outer guiding surface 244 via the junction 23.

As illustrated in FIGS. 4 and 5, the straight intermediate portion 211 of the inner guiding surface of each of the pieces 21 is inclined with respect to axial and radial directions of the sprocket assembly so as to facilitate the chain 30 to be shifted smoothly between the large and small sprocket wheels 20a and 20b. As illustrated, the outer guiding surface 244 (see FIG. 3) has a bottom end which is spaced apart from the middle point or bottom end of the corresponding tooth valley 22 at a distance (a) so as to make the chain 30 engage with the corresponding tooth tip 25, in such a manner that the tooth tip 25 contacts the lagging edge of an inner link plate 34 (see FIG. 5). In this situation, the axis of a roller 34 is located right over the bottom end of the outer guiding surface 244 (see FIG. 3). In this way, any tooth tip 25 of the large sprocket wheel 20b cannot hinder any inner link plate 33 of the chain 30 from forward movement. Accordingly, each of the tooth tips 25 can mesh smoothly and quickly with the corresponding tooth-tip 37 of the large sprocket wheel 20b.

With this invention thus explained, it is apparent that numerous modifications and variations can be made without departing from the scope and spirit of this invention. It is therefore intended that this invention be limited only as indicated in the appended claims.

I claim:

1. A speed varying sprocket assembly for use in combination with a driving chain of a bicycle, said speed varying sprocket assembly including a small sprocket wheel and a large sprocket wheel which are mounted coaxially so as to permit the chain to be shifted from one to the other one of said small and large sprocket wheels, tooth number of said small sprocket wheel being smaller than that of said large sprocket wheel, said large sprocket wheel having an inner side surface adjacent to said small sprocket wheel, and an annular peripheral tooth face defining a plurality of teeth each of which is provided with a tip and a bottom so as to define a tooth valley between any adjacent pair of said teeth, each of the tooth valleys having a middle point at a bottom end thereof, the improvement comprising:

said large sprocket wheel further having several guide units each of which includes a notch formed in said large sprocket wheel, and an elongated chain guiding piece which is secured to said inner side surface of said large sprocket wheel and which is adjacent to said notch, said notches being respectively formed in some of said teeth which are spaced apart from each other, each of said notches being formed at a corner defined between said inner side surface and said annular tooth face and being defined by a curved outer guiding surface extending from the tip of a corresponding one of said teeth to one of the tooth valleys which is adjacent to the corresponding one of said teeth, each of said outer guiding surfaces having a width so as to permit an outer link plate of the chain to slide thereon, each of said pieces having a radial inner end, a radial outer end, and an inner guiding surface that has a straight intermediate portion, a curved inner end portion and a curved outer end portion which makes a junction with a corresponding one of said outer guiding surfaces so as to guide the chain to slide from said inner guiding surface to the corresponding one of said outer guiding surfaces via the junction, said straight intermediate portions of said inner guiding surfaces of said pieces being inclined with respect to axial and radial directions of said sprocket assembly so as to facilitate said chain to be shifted between said large and small sprocket wheels, each of said outer guiding surfaces having a bottom end which is spaced apart from the middle point of a corresponding one of the tooth valleys at a predetermined distance so as to make the chain engage with the corresponding one of the teeth, in such a manner that the tip of the corresponding one of the teeth contacts a lagging edge of an inner link plate of the chain, whereby, in each of the guide units, the chain can slide on the inner and outer guiding surfaces.

2. A speed varying sprocket assembly as claimed in claim 1, wherein said predetermined distance ranging from 1 millimeter to 3 millimeters.

* * * * *